United States Patent [19]

Mott

[11] Patent Number: 4,813,914
[45] Date of Patent: Mar. 21, 1989

[54] STRAP DRIVE WITH A SAFETY STOP FOR REVERSE TORQUES

[75] Inventor: Philip J. Mott, Dryden, N.Y.

[73] Assignee: Borg-Warner Automotive, Inc., Troy, Mich.

[21] Appl. No.: 138,415

[22] Filed: Dec. 28, 1987

[51] Int. Cl.[4] ............................................. F16H 55/52
[52] U.S. Cl. ........................................... 474/8; 474/12
[58] Field of Search .................. 474/8, 11, 12, 17, 18, 474/19, 28, 69, 70; 464/55, 69, 87

[56] References Cited

U.S. PATENT DOCUMENTS

| | | | |
|---|---|---|---|
| 1,124,966 | 1/1915 | Stack | 464/55 |
| 3,715,928 | 2/1973 | Case et al. | 474/1 |
| 3,780,538 | 12/1973 | Mann | 464/17 |
| 3,868,862 | 3/1975 | Bessette | 474/12 |
| 3,888,130 | 6/1975 | Blanchette | 474/12 |
| 4,010,654 | 3/1977 | Maucher et al. | 474/13 |
| 4,019,345 | 4/1977 | Fukuda | 474/69 |
| 4,364,735 | 12/1982 | Plamper et al. | 474/8 X |
| 4,601,679 | 7/1986 | Bock | 474/11 |
| 4,617,004 | 10/1986 | Mott | 474/8 |

*Primary Examiner*—Thuy M. Bui
*Attorney, Agent, or Firm*—Robert L. Zieg; James J. Jennings; James A. Geppert

[57] ABSTRACT

A strap device for a pulley of a continuously variable transmission wherein a flexible strap has one end secured to the axially movable sheave of the pulley and the opposite strap end is secured to the cover encompassing the movable sheave, which cover is mounted on the rotary shaft for the pulley. To prevent buckling of the strap under reverse torques, a safety stop in the form of a pin is mounted in the cover to project into a slightly arcuate axial slot in the sheave hub and prevent undue relative rotation between the sheave and cover.

5 Claims, 1 Drawing Sheet

STRAP DRIVE WITH A SAFETY STOP FOR REVERSE TORQUES

BACKGROUND OF THE INVENTION

The present invention relates to a strap drive connection for the pulley of a continuously variable transmission (CVT). Transmissions of this type are well known in the art and conventionally include a pair of pulleys interconnected by a belt; wherein each pulley includes a pair of sheaves or flanges, at least one of which is axially movable to vary the spacing between the sheave faces and thus the point of contact of the belt with the sheaves. By varying the spacing between the pulley sheaves of the pulleys, continuous adjustment of the drive ratio is provided between the shafts carrying the pulleys. Mechanical or hydraulic means and/or combinations of the two are usually provided for adjustment of the sheaves to initiate drive ratio changes.

As disclosed in the prior art, the axially movable sheave or flange of each pulley or a hub of such sheave is provided with means to connect the sheave to the pulley shaft for simultaneous rotation, but allowing relative axial movement. Such connecting means includes an internal keyway cooperating with a key received therein. The keyways are machined in the shafts and flanges which is an expensive procedure, and lubrication of the key-keyway connection may be difficult at times. If lubrication is not adequate, the key may bend in the keyway and loading on the key becomes excessive in view of the mass of the pulley rotating at relatively high speeds.

Another means of connection for the pulley sheave on the shaft is the ball-spline wherein a plurality of balls are utilized with a spline. The balls function as anti-friction elements and the connection is located internally of the sheave or flange and/or its hub. This type of connection is expensive and has the drawback that it requires continuous lubrication to insure continuing performance. Also, loading on the spline of this connection can become excessive, resulting in premature failure of the transmission.

A more recent development is the use of a flexible strap drive between a spider or cover for the movable sheave and the sheave. This connection is illustrated in U.S. Pat. No. 4,617,004 where a single flexible strap provides the driving force to rotate the movable sheave but allows the necessary axial movement of the sheave to vary the drive ratio. Although only one strap is shown, a pair of drive straps may be used for dynamic balancing.

A further development for a drive strap is illustrated in U.S. Pat. No. 4,601,679 where a pair of drive straps are provided in which one strap is in tension while the other strap is in compression and would buckle. Upon reversal of rotation, the buckled strap would be placed in tension and straighten out while the strap originally in tension would now buckle. Thus, in both of these patents, buckling of the drive strap under reverse torques becomes a problem, and the present invention provides a solution for this problem.

SUMMARY OF THE INVENTION

The present invention relates to a novel strap drive arrangement for the pulley of a continuously variable transmission wherein the drive strap extends between connections to the cover and to an axially movable rotary drive sheave for the pulley. During rotation in the drive direction, the drive strap is in tension, however, in an overload condition in reverse torque, the drive strap is in compression and has a tendency to buckle. To prevent the strap from fully buckling, a stop is located in the shoulder of the sheave hub and cooperates with the cover to prevent excess buckling. More specifically, a longitudinal slot is formed in the sheave hub to cooperate with a stop pin pressed into a shoulder in the cover encompassing the pulley sheave.

Further objects are to provide a construction of maximum simplicity, efficiency, economy and ease of assembly and operation, and such further objects, advantages and capabilities as will later more fully appear and are inherently possessed thereby.

DESCRIPTION OF THE PREFERRED EMBODIMENT

Figure 1:
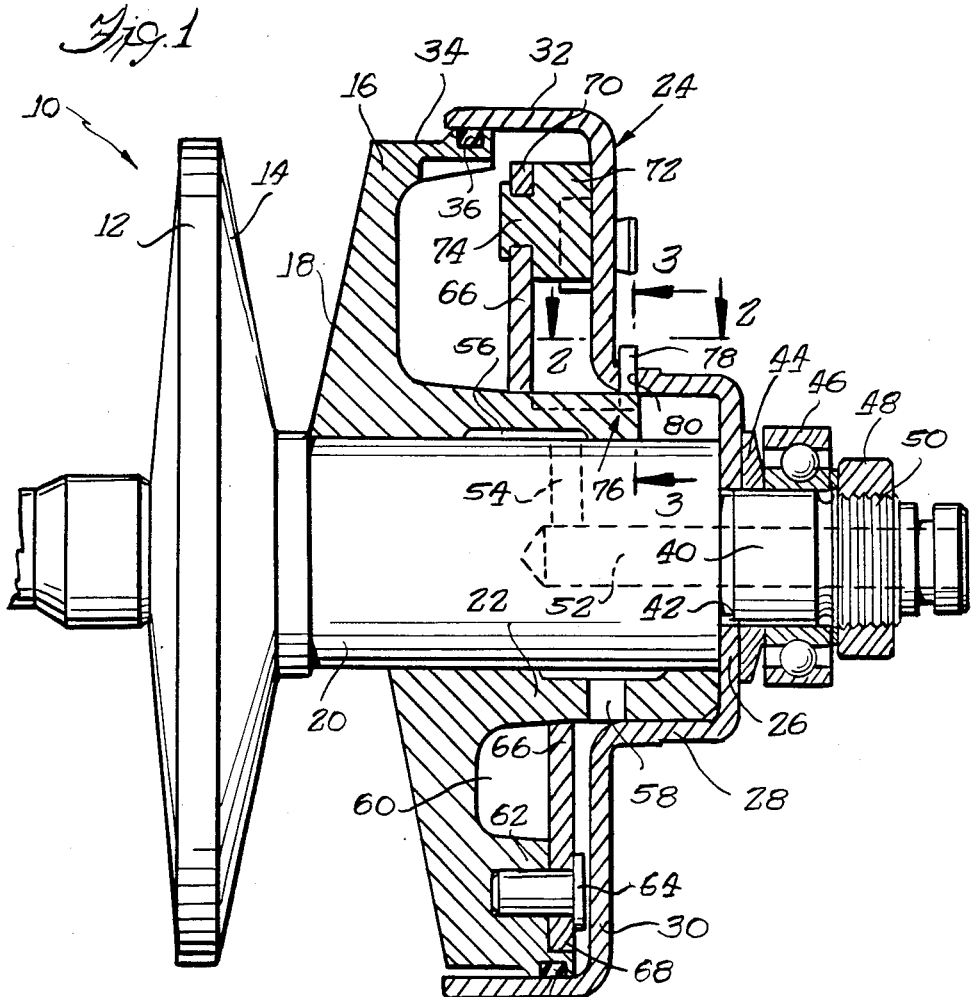
FIG. 1 is a side elevational view of a pulley and cover embodying the present invention, partially in cross section with the upper half of the figure showing the pulley in one position and the lower half showing the pulley in a second drive position.

Referring more particularly to the disclosure in the drawing wherein is shown an illustrative embodiment of the present invention, FIG. 1 discloses a pulley 10 for a continuously variable transmission (CVT), such as shown in U.S. Pat. No. 4,617,044, which may be either the drive pulley or driven pulley. The pulley comprises a fixed generally conical sheave 12 and an axially movable generally conical sheave 16 having facing surfaces 14 and 18 respectively, defining a generally V-shaped space to receive a drive belt (not shown). The sheave 12 is press fit on a shaft 20 which may either be connected to the prime mover or to a drivable means depending on its position in the CVT.

The movable sheave 16 has an axial hub 22 slidable on shaft 20 toward and away from sheave 12 to alter the spacing therebetween and thus alter the radial position of the drive belt between the sheaves. A generally bell-shaped cover or housing 24 has an inner radial flange 26 and an outer radial flange 30 joined by an intermediate shoulder 28; the outer flange 30 terminating in an axially extending flange 32 in sliding sealing engagement with a resilient sealing ring 38 received in a groove 36 in the periphery 34 of the sheave 16. A reduced end 40 of the shaft 20 is received in the opening 42 defined by the inner housing flange 26. Also received on the reduced shaft end 40 is a spacer 44, a bearing 46 and an internally threaded retainer nut 48 in threaded engagement with a threaded portion 50 on the shaft 40.

The shaft 20 also includes a central passage 52 extending for a portion of the length thereof from the reduced shaft end 40 terminating in one or more radial passages 54 opening into an annular groove or channel 56 of a substantial length formed in the hub 22 to be in communication with the radial passages 54 throughout the extent of axial travel of the pulley sheave 16. One or more radial passage 58 formed in the sheave hub 22 communicate between the channel 56 and the chamber 60 defined by the cover 24 and movable sheave 16 sealed by ring 38.

A rearwardly extending lug 62 on the movable sheave 16 has a rivet 64 securing one end 68 of a drive strap 66 thereto; the opposite end 70 of the strap being secured to a forwardly extending lug 72 in the cover 24 by a rivet 74. The drive strap extends in a chordal fashion at one side of the shaft 20 and may be a single flexible member or a plurality of spring-like members forming a pack. The strap flexes axially to allow axial movement of the sheave 16 and acts under tension to provide a positive drive between the cover 24, and thus the shaft 20 and sheave 12, and the movable sheave 16 to drive the belt.

Figure 2:
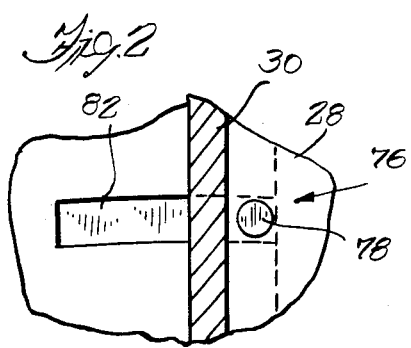
FIG. 2 is a partial horizontal cross sectional view taken on the line 2—2 of FIG. 1.
Figure 3:
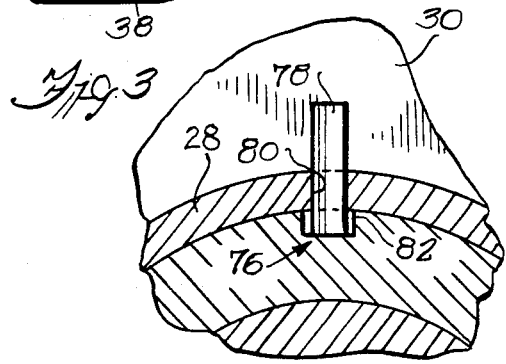
FIG. 3 is a partial vertical cross sectional view taken on the line 3—3 of FIG. 1.

Under a severe reverse torque, the strap 66 will have a tendency to buckle when the strap is in compression. To prevent large deflections in the strap, a safety stop 76 is provided in the form of a stop pin 78 press fitted into an opening 80 in the intermediate cover shoulder 28 and extending into a slightly arcuate longitudinal slot or channel 82 in the sheave hub 22; the channel allowing axial movement of the sheave relative to the cover and stop pin. As seen in FIGS. 2 and 3, the slot or channel is wider than the diameter of the pin to allow for relative rotation between the cover and shaft for operation of the drive strap 66.

During normal operation, the stop pin 78 would not contact either side of the channel 82, and only at overload condition in reverse torque would the stop be active to prevent undue buckling of the drive strap. Also, to dynamically balance the strap 66, a counterweight portion can be provided on the sheave flange, such as shown in U.S. Pat. No. 4,617,004. Hydraulic pressure to alter the positioning of the movable sheave 16 enters chamber 60 from the passage 52; retraction of the sheave being accomplished by the resilient action of the drive strap 66.

I claim:

1. A variable pulley having a first sheave and a second sheave for use in a variable pulley transmission, said sheaves defining a generally V-shaped space therebetween to receive a drive belt of the transmission, a rotatable shaft having a central axis with the first sheave drivingly connected thereto for rotation therewith, said second sheave having a central hub journalled on said shaft for axial reciprocation thereon but not rotatable therewith, a drive member comprising a cup-like cover housing said movable sheave concentric with and drivingly connected to said shaft, and a flexible strap having opposite ends mounted on axes parallel to the axis of the shaft, one strap end being connected to the drive member and the opposite end being connected to the movable sheave, said strap being flexible to permit axial movement of the second sheave relative to the first sheave, the improvement comprising a safety stop acting between the cover and movable sheave hub to prevent undue buckling of said drive strap due to relative rotation under reverse torque.

2. A variable pulley having a first sheave and a second sheave for use in a variable pulley transmission, said sheaves defining a generally V-shaped space therebetween to receive a drive belt of the transmission, a rotatable shaft having a central axis with the first sheave drivingly connected thereto for rotation therewith, said second sheave having a central hub encompassing said drive shaft for axial reciprocation thereon but not rotatable therewith, a drive member comprising a cup-like cover housing said movable sheave concentric with and drivingly connected to said shaft, and a flexible strap having opposite ends mounted on axes parallel to the axis of the shaft, one strap end being connected to the drive member and the opposite end being connected to the movable sheave, said strap being flexible to permit axial movement of the second sheave relative to the first sheave, the improvement comprising a safety stop acting between said cover and movable sheave hub to prevent undue buckling of the drive strap under reverse torque, said cover including an intermediate shoulder encompassing said sheave hub, and said safety stop comprising a stop pin pressed into said shoulder and projecting into said sheave hub.

3. A variable pulley as set forth in claim 2, wherein said sheave hub has a longitudinal channel on its exterior surface receiving the end of the stop pin.

4. A variable pulley as set forth in claim 3, wherein said hub channel is wider than the diameter of the stop pin to allow relative rotation between the cover and movable sheave.

5. A variable pulley as set forth in claim 4, wherein under normal operation with the drive strap in tension or compression, the stop pin does not contact the sides of the channel.

* * * * *